March 3, 1959 G. BONMARTINI 2,876,049
ROLLING DEVICES FOR VEHICLES OF ANY KIND
Filed March 28, 1956 5 Sheets-Sheet 1
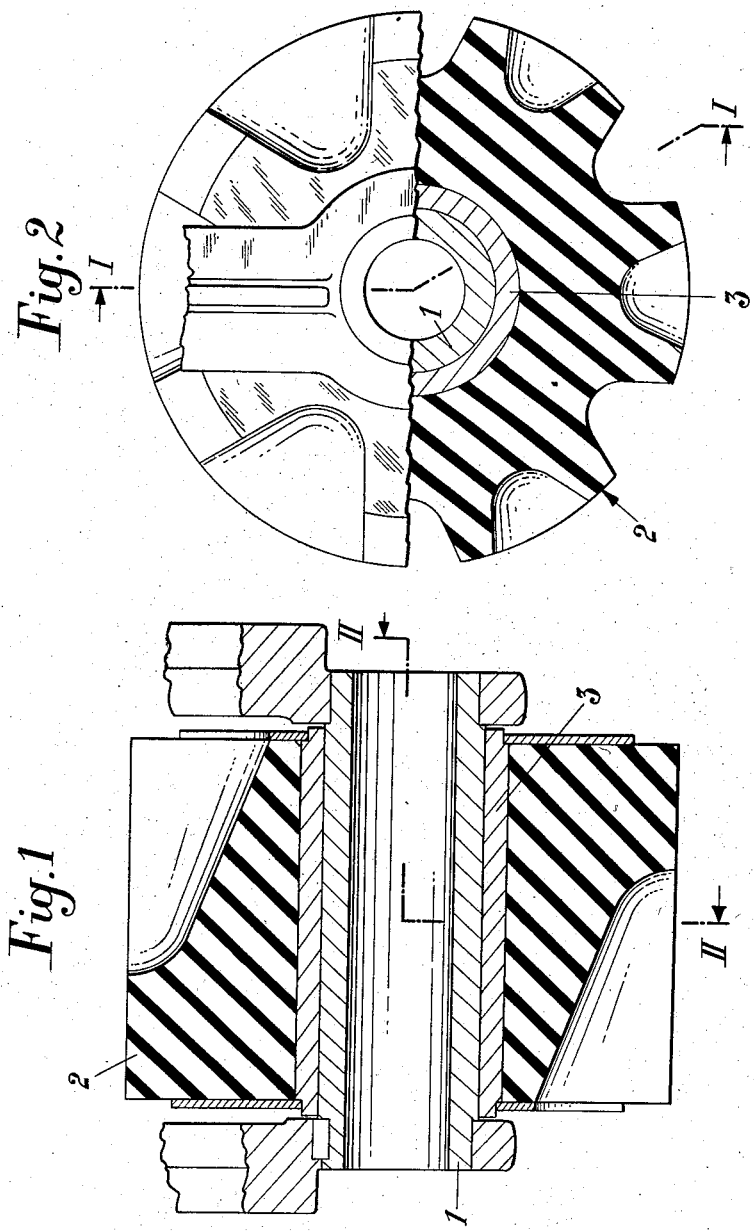

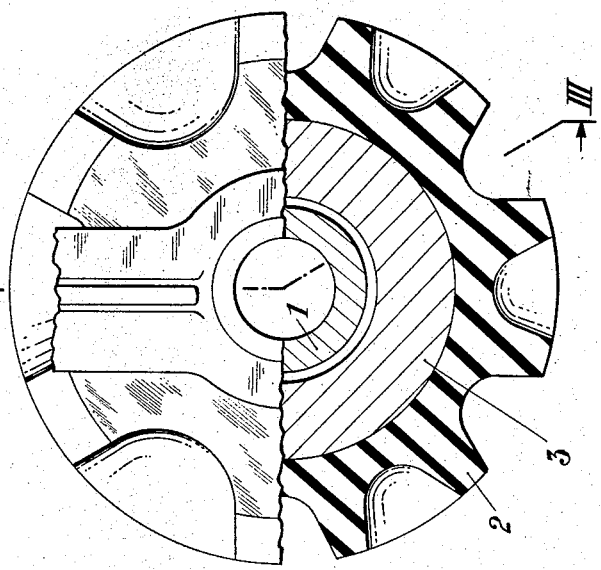
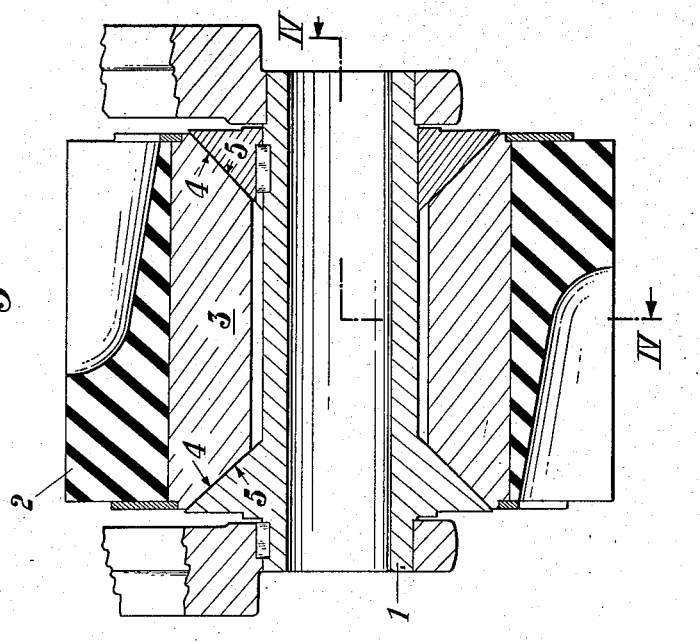

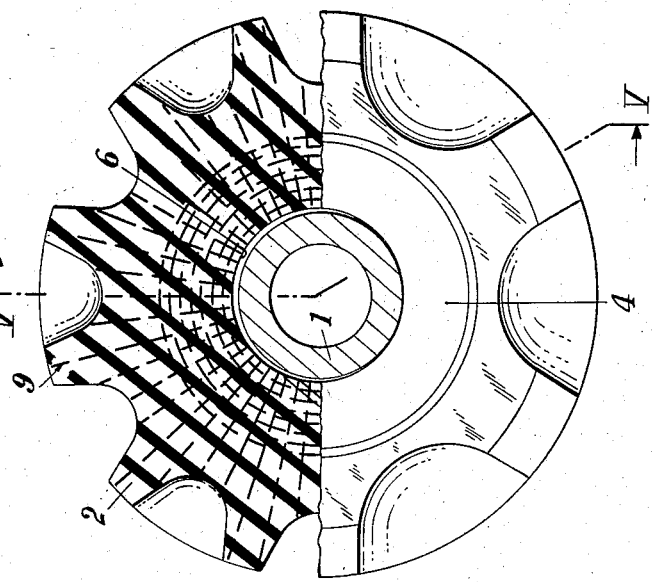
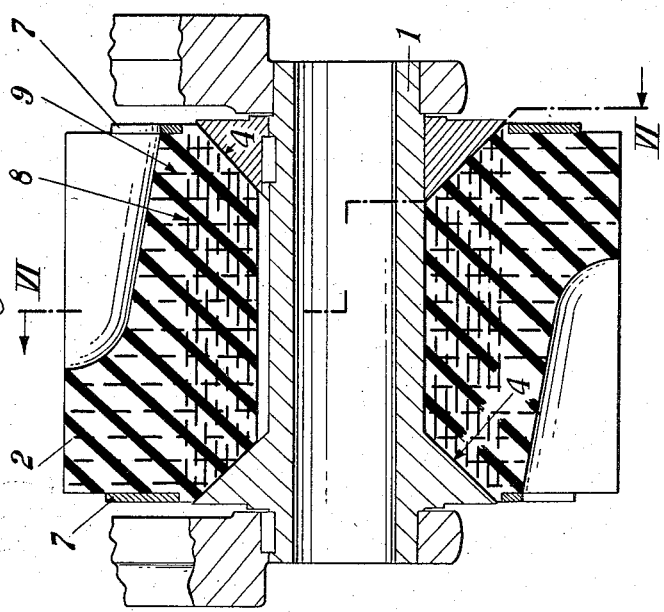

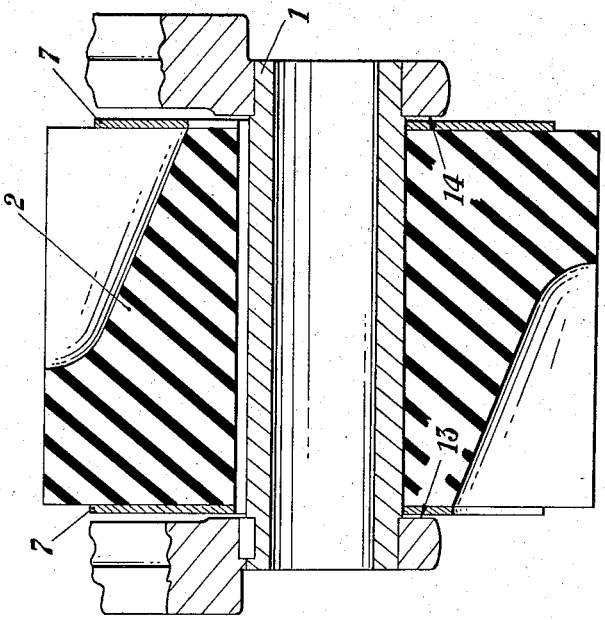
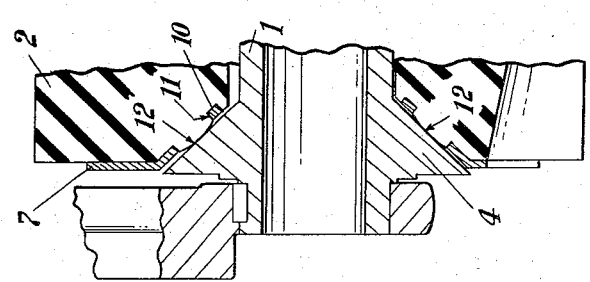
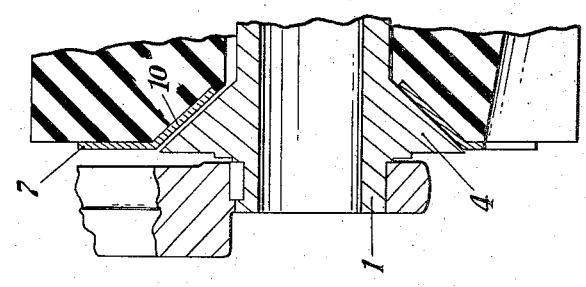

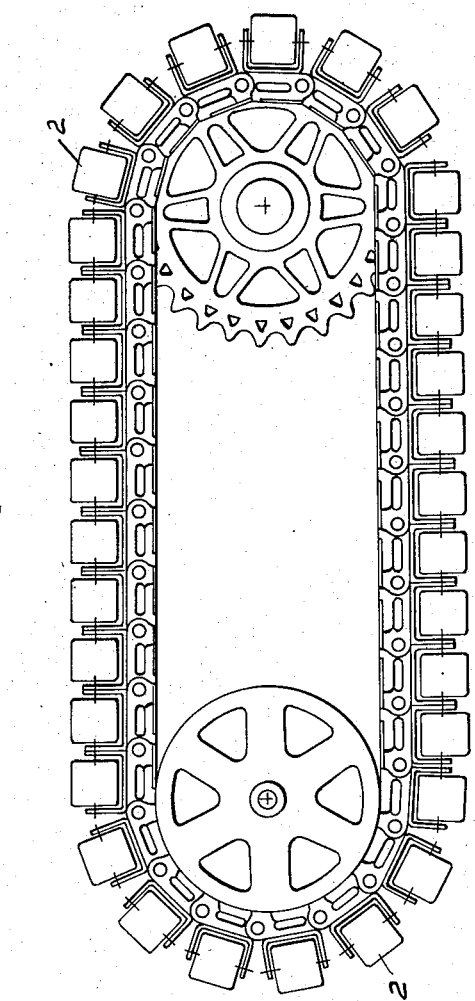

2,876,049
Patented Mar. 3, 1959

2,876,049
ROLLING DEVICES FOR VEHICLES OF ANY KIND

Giovanni Bonmartini, Rome, Italy, assignor to "EST" Etablissement Sciences Techniques, Vaduz, Liechtenstein, a company of Liechtenstein Application March 28, 1956, Serial No. 574,508

Claims priority, application Italy February 13, 1956

10 Claims.  (Cl. 305—10)

The present invention relates to an improvement in rolling devices for vehicles of the type which have been described and illustrated in Italian Patent No. 506,405 as well as in Italian patent application No. 17,070/1953 of December 23, 1953.

The afore said Italian Patent No. 506,405 discloses a rolling device for vehicles of the track type, wherein support on the ground is obtained by means of a plurality of rotatable members mounted along the periphery of the tracks, the axes of rotation of said members being disposed along the length of the tracks. According to said patent, braking devices are provided for said rotatable members, said braking devices being arranged so as to act at least on part of said members and at most, on all of the rotatable members resting on the ground, in order to increase the resistance of the vehicle to transverse stresses.

According to the present invention, each roller is provided with its own non-controlled braking device, opposing the rotation of the roller by a maximum moment which is substantially less (in absolute value) than the maximum moment (having a contrary or opposite sign) which may urge the roller to rotate due to the friction of said roller on the ground. In other words, according to the present invention, each roller is braked in a manner which does not restrain the rotation of said roller when this latter is urged to rotate due to turning of the vehicle upon which the roller carrying track is mounted in the plane of the ground, i. e., about a vertical axis, said roller being however braked so as to prevent the roller from rotating when it is urged to rotate about its axis due to the sloping of the ground in a direction at right angles to the direction of motion of the vehicle, under ordinary conditions.

According to the present invention, each roller is mounted on a non-rotatable spindle, the roller being braked with respect to said spindle both by contact of the inner cylindrical surface of the roller on the outer surface of the spindle and by contact between the ends, suitably cone-shaped, of said roller and of corresponding members carried by the same non-rotatable spindle of the roller. Without departing from the scope of this invention, this braking action can also be obtained by other means.

The attached drawings show certain embodiments of the invention forming the object of the present application, it being however understood that the embodiments, as illustrated and described, are in no way limitative, but only examples of the inventive subject-matter defined in the claims.

Fig. 1 is a sectional view, partly in elevation, of a roller for track laying vehicles embodying features of the present invention, as seen along line I—I of Fig. 2;

Fig. 2 is a partially sectioned view of the roller of Fig. 1 taken along the line II—II of Fig. 1;

Fig. 3 is a sectional view, partly in elevation, of a modified form of wheel construction as seen along line III—III of Fig. 4;

Fig. 4 is a partially sectioned view of the roller construction of Fig. 3, taken along line IV—IV of Fig. 3;

Fig. 5 is a sectional view, partly in elevation, of a still further modified form of roller construction as seen along line V—V of Fig. 6;

Fig. 6 is a partial sectional view of the construction of Fig. 5 taken along line VI—VI of Fig. 5;

Fig. 7 is a fragmentary sectional view of another form of roller construction;

Fig. 8 is a similar view of still another form of roller;

Fig. 9 is a sectional view of a further modified form of roller construction; and Fig. 10 is a side elevational view of rollers of the present invention in operative position on a tracked vehicle.

Referring to the drawings, Fig. 1 shows a roller of the general type set forth in the above-mentioned Italian patents, wherein the individual braking device is comprised of a pivot 1 (carrying the roller which is in turn comprised of a tread 2 made either of rubber or of any technologically equivalent material and of an inner sleeve 3, made either of metal or of any technologically equivalent material) which has a substantial diameter with respect to the outer diameter of the roller 2, so as to afford a substantial frictional resistance to rotation of the roller about the stationary pivot or spindle 1. As is known, said resistance is substantially proportional to the load applied to the roller 2 through the spindle 1. In practice, the ratio of the outer diameter of the roller 2 to the diameter of the spindle 1 is determined so that the braking action on the roller with respect to the spindle will be in conformity with the minimum frictional coefficient which is to be expected for the roller in relation to the ground.

In Fig. 2 it will be seen that the hub 1 may be formed by a tube instead of a solid shaft to reduce the weight of the assembly.

As seen in Figs. 3 and 4, friction between the roller and the spindle is obtained by causing these members to rest on conical surfaces 4 and 5 carried by the spindle 1 and by the ends of the sleeve 3 of the roller, respectively.

In Figs. 5 and 6 the roller 2 is shown as made entirely of elastic rubber (or of any technologically equivalent material) so that the roller directly rests (instead of by the insertion of a sleeve made either of metal or of any equivalent material) on the spindle 1 and on its conical ends 4, respectively.

Fig. 6 shows a clearance or play 6 between the inner surface of the roller 2 and the outer surface of the spindle 1, said clearance having the purpose of allowing liquids which may enter the space between the spindle and the roller (such as water, mud and so on) to be squeezed forwardly with respect to the mutually contacting areas of the cylindrical surfaces, viz., the outer surface of the spindle and the inner surface of the roller. Thus, these surfaces are submitted to no lubricating action by said liquids which therefore ensures that the value of the frictional coefficient between the spindle and the roller is kept at a constant value.

In this form of embodiment the roller 2 is made entirely of the same material, e. g., vulcanized elastic rubber. At either end of the roller are applied metallic plates 7 which have the function of protecting the bases of the elastic body of the roller 2.

Also in Figs. 5 and 6, a reinforcing axial and transverse reinforcement unit is shown at 8 and 9, said reinforcement unit being made either of yarns or of fabric of nylon, of steel or of any other suitable material, and being capable of reinforcing the roller 2 in the zones of maximum stress.

The end discs or plates 7 (Figs. 5 and 6) may also extend as shown in Fig. 7, with their inner conical flanges 10 cooperating with the conical surface of the spindle 1. Fig. 8 illustrates a variation of this form of embodiment, according to which the conical flanges 10 of the plates 7 are apertured at 11, so as to allow the elastic material forming the roller 2 to protrude through the apertures at 12 to come into contact with the conical surfaces 4 of the stationary spindle 1.

Fig. 9 illustrates, by way of example, a roller 2 made entirely of elastic material (either rubber or technologically equivalent material) provided with flat end plates 7, the roller being mounted on a cylindrical stationary spindle 1 the ends of which are plain, as shown at 13 and 14, instead of being conical.

The several forms of embodiment, as illustrated and described, have been set forth only by way of example in order to show those skilled in the art the practical application of the present invention, i. e., an individual braking device for each roller, said braking device being capable of operating both without any human control and without any intervention of automatic devices carried by the vehicle upon which the roller track is mounted.

In other words, the problem, solved by the present invention consists in simplifying known devices which restrain the rotation about their axes of the rollers of tracks in the intermediate zone of that portion of the track which, at any given moment, contacts the ground, so as to allow easy operation and steering of the vehicle, although restraining the transverse motion of the vehicle, at right angles to the direction of motion. It is to be noted that, by the present invention, all of the rollers of the track are braked at all times, and therefore, all of the rollers which, at any given moment, are in contact with the ground are braked, in contrast with known devices wherein only some of the rollers in contact with the ground are braked. Therefore, when a vehicle of this latter type does not rest on the ground with the full lower run of the track, for instance when the vehicle is passing a ditch, and at a given moment rests on the ground only by the forward and the rear rollers of said run, with no contact by the central rollers (which are the braked rollers according to known devices), said vehicle is free to glide laterally if the track is of the known type as set forth in the above-mentioned patents. However, such gliding is avoided, so that the vehicle travels properly, if the track is provided with individually braked rollers, according to the present invention.

The improvement, attained according to the present invention derives from the discovery that, for practical purposes it is sufficient that each roller is braked with respect to rotation about its axis to such an extent that it does not reach the maximum moment of rotation which may be induced on the roller by the ground under conditions of common use, the ground having under these conditions, the minimum frictional coefficient.

The braking action on the single rollers may be obtained by any of the disclosed means, and its adjustment during manufacture may be varied by changing the materials which are in contact, for instance by making the stationary spindle 1 (and/or its conical ends) of a non-metallic material, e. g., of synthetic resin, such as nylon or any other suitable resin. Also the protective plates 7 may be made, according to the present invention, either of nylon or of other synthetic material, instead of metal.

The materials selected for ensuring, by their mutual friction, a suitable braking action on the roller, may be applied as linings for the moving parts, instead of forming, as aforesaid, the parts themselves. Thus, the roller 2, instead of being made entirely of elastic material, as aforesaid, can be internally lined with a bushing made of synthetic material, positioned to act on a metallic spindle, or on a spindle made of synthetic material or some other non-metallic material. Thus bushing may be free between the roller and the spindle, so that the bushing may be changed.

From the above disclosure it is obvious, for those skilled in the art, that several forms of embodiment may be easily provided in accordance with the present invention, rendering the braking action on each roller proportional or not to the load and/or to the tractive stress exerted by the track.

By means of the forms of embodiment of the braking system for the rollers illustrated and described, or only mentioned in this specification, a track vehicle may easily negotiate turns in the plane of the ground, because the rollers spaced apart from the center of rotation are sufficiently free to rotate about their own axis and thus avoid the tearing of the ground and the great stress necessary to cause the common plates of the conventional tracks to glide on the ground. Furthermore, such a vehicle is capable of traveling and working even on ground which slopes steeply in a direction at right angles to the direction of travel of the vehicle, in that the transverse gliding of said vehicle is opposed by the sum of the braking stresses of all of the rollers in contact with the ground, while, when the vehicle negotiates a turn on the plane of the ground, only some of the rollers in contact with the ground are stressed to rotate.

I claim:

1. A rolling device for track laying vehicles which comprises an endless track with a plurality of rollers associated with the track and each roller being rotatable about an axis parallel to the plane of the track, a shaft for each roller having in each cross section of the shaft an outer diameter substantially equal to the inner diameter of said roller, at the same cross section of the shaft, each shaft receiving each roller by friction contact to effect a self-braking action on the roller when the roller is caused to rotate due to the friction between the roller and the ground when the track laying vehicle moves on a ground having a transverse slope with respect to its direction of motion, the outer diameter of said shaft in each cross section of the shaft being selected with respect to the outer diameter of said roller to generate a moment produced by friction between the shaft and the roller which is less than the maximum moment which urges the roller to rotate due to the friction between the roller and the ground.

2. A rolling device as defined in claim 1, wherein said roller includes an inner sleeve mounted upon said shaft, said sleeve having an internal diameter substantially equal to the external diameter of said shaft.

3. A device as defined in claim 1, wherein said shaft is provided with means defining conical surfaces and said roller is formed with corresponding conical surfaces for engagement with the conical surfaces of the shaft.

4. A device as defined in claim 1, wherein said roller is made entirely of an elastic material.

5. A device as defined in claim 4, wherein said roller is provided with reinforcing means.

6. A device as defined in claim 1, wherein at least part of each roller and shaft unit is formed from a synthetic plastic material.

7. A device as defined in claim 1, wherein the axially spaced apart end surfaces of said roller are provided with rigid protective plates.

8. A device as defined in claim 7, wherein said end surfaces are provided adjacent said shaft with conical surfaces and said plates extend into said conical surfaces for engagement with the corresponding surface portions of said shaft.

9. A device as defined in claim 8, wherein the portions of said plates extending into said conical recesses are apertured and the roller is formed from an elastic material whereby the elastic material protrudes through said apertures and is brought into contact with the adjacent surface portions of said shaft.

10. A device as defined in claim 1, wherein said roller includes a main body portion and a central sleeve engaging with said shaft, said sleeve being formed from a rigid material and being free from interconnection with said shaft and said body portion.

References Cited in the file of this patent

UNITED STATES PATENTS

| | | |
|---|---|---|
| 1,407,964 | Turnbull | Feb. 28, 1922 |
| 1,752,395 | Richardson | Apr. 1, 1930 |
| 2,637,345 | Kraft | May 5, 1953 |
| 2,751,259 | Bonmartini | June 19, 1956 |